United States Patent
Togawa et al.

(10) Patent No.: US 7,561,799 B2
(45) Date of Patent: Jul. 14, 2009

(54) OPTICAL PATH SWITCHING DEVICE

(75) Inventors: Masayuki Togawa, Tokyo (JP); Morio Kobayashi, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 319 days.

(21) Appl. No.: 11/074,566

(22) Filed: Mar. 8, 2005

(65) Prior Publication Data
US 2005/0201750 A1    Sep. 15, 2005

Related U.S. Application Data

(63) Continuation of application No. PCT/JP2004/013172, filed on Sep. 9, 2004.

(30) Foreign Application Priority Data
Sep. 10, 2003    (JP) ............................. 2003-319098

(51) Int. Cl.
    *H04J 14/00* (2006.01)
(52) U.S. Cl. .................. 398/45; 398/5; 398/2; 398/12; 398/13; 398/19; 398/20; 398/33; 398/48; 385/24; 385/16; 385/17; 385/18
(58) Field of Classification Search .............. 398/1, 398/2, 5, 3, 7, 10, 12, 13, 14, 17, 19, 4, 30, 398/31, 33, 45, 48, 50, 55, 56, 83, 86, 82, 398/88, 20, 79; 385/24, 16, 17, 18
See application file for complete search history.

(56) References Cited

U.S. PATENT DOCUMENTS

| 6,115,154 A | * | 9/2000 | Antoniades et al. | ............. 398/4 |
| 6,243,511 B1 | * | 6/2001 | Laughlin | ...................... 385/18 |
| 6,289,148 B1 | * | 9/2001 | Lin et al. | ...................... 385/24 |
| 6,363,182 B2 | * | 3/2002 | Mills et al. | .................... 385/17 |
| 7,174,096 B2 | * | 2/2007 | Berthold et al. | ................. 398/5 |

FOREIGN PATENT DOCUMENTS

| JP | 62-199704 U | 12/1987 |
| JP | 63-40121 A | 2/1988 |
| JP | 64-37524 A | 2/1989 |
| JP | 1-188806 | 7/1989 |
| JP | 2001-350105 A | 12/2001 |

* cited by examiner

*Primary Examiner*—Hanh Phan
(74) *Attorney, Agent, or Firm*—Panitch Schwarze Belisario & Nadel LLP (57) ABSTRACT

An optical path switching device includes compact and unpackaged components; the components are mounted onto a single platform; and the components are coupled by luminous flux. Connection between optical fibers is negated. In particular the optical path switching device includes an optical input, an optical output, an optical branching device and an optical signal detection device. At least two of the optical input, the optical output, the optical branching device and the optical signal detective device are mounted onto a single platform.

4 Claims, 11 Drawing Sheets

OPTICAL PATH SWITCHING DEVICE

CROSS-REFERENCE TO RELATED APPLICATIONS

This application is a continuation of International Application No. PCT/JP2004/013172, filed Sep. 9, 2004, the disclosure of which is incorporated herein by reference.

BACKGROUND OF THE INVENTION

The present invention relates to a failure-protection optical path switching device for switching between optical paths employed in the field of optical communication, such as an optical communication network or an optic LAN.

In an optical communication network, when a failure occurs in a working line that is transmitting optical communication signals, the line is switched to a backup line, thereby preventing a communication failure.

Figure 1A:
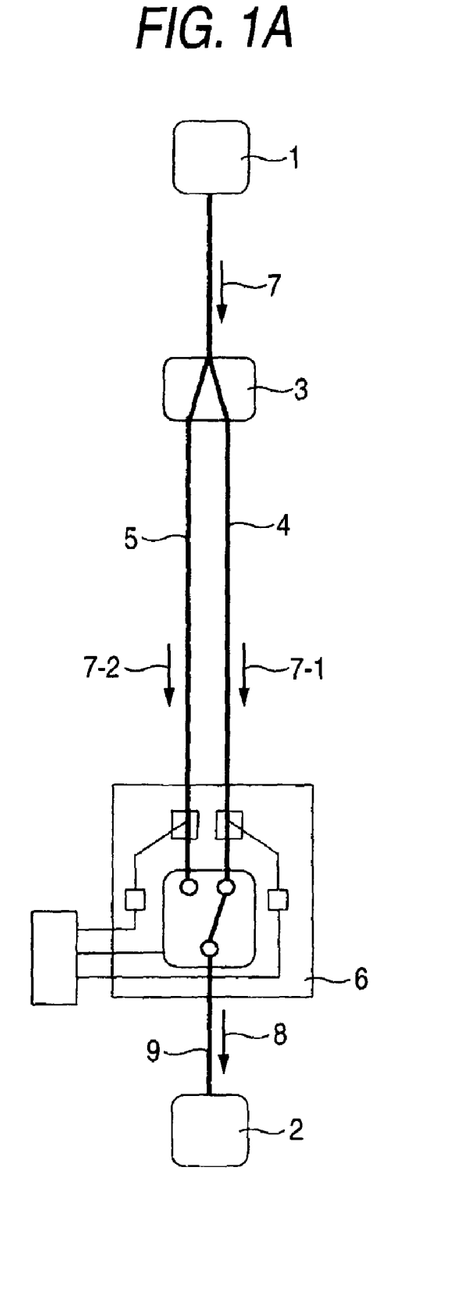
FIGS. 1A and 1B are views for explaining an example of failure-protection line switching employed in a point-to-point optical communication network.
Figure 1B:
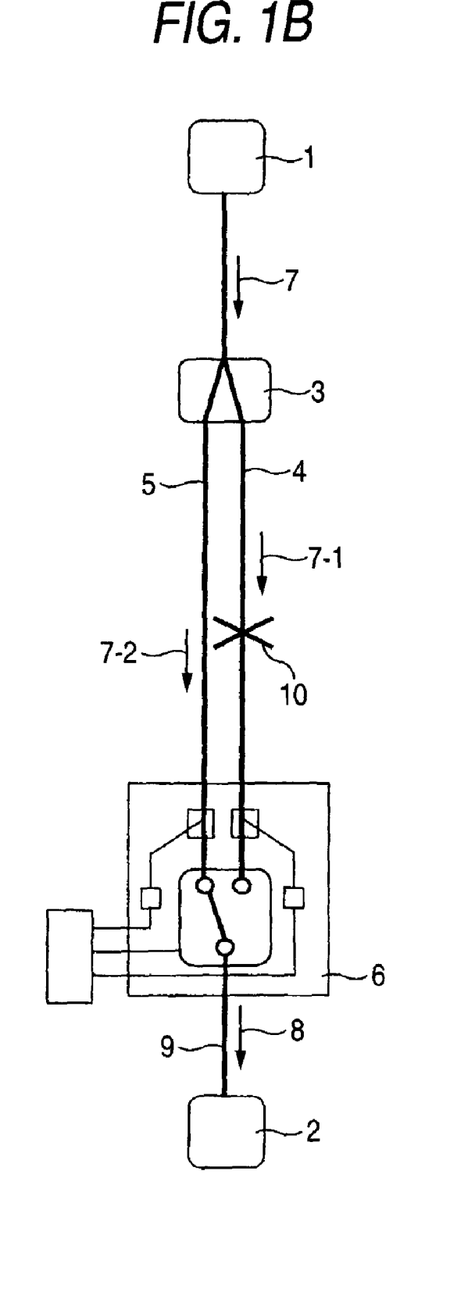

FIGS. 1A and 1B are views for explaining a 1+1 failure recovery system adopted in a point-to-point optical communication network. FIG. 1A is a view for explaining a case where no failure has occurred, and FIG. 1B is a view for explaining a case where a failure has occurred.

The 1+1 failure recovery system employs an optical transmitter 1, an optical receiver 2, an optical fiber coupler 3, a working line 4 constituted of an optical fiber, a backup line 5 constituted of an optical fiber, a failure-protection optical path switching device 6, and a receiving-side line 9. An optical communication signal 7 output from the optical transmitter 1 is branched into an optical communication signal 7-1 for the working line 4 and an optical communication signal 7-2 for the backup line 5. The failure-protection optical path switching device 6 is configured such that, during a normal time when no failure has occurred, the optical communication signal 7-1 from the working line 4 is transmitted to the optical receiver 2 as a received optical communication signal 8 by way of the receiving-side line 9. Meanwhile, when a failure 9 has occurred, the optical communication signal 7-2 from the backup line 5 is transmitted to the optical receiver 2 as a received optical communication signal 8 by way of the receiving-side line 9.

Figure 2:
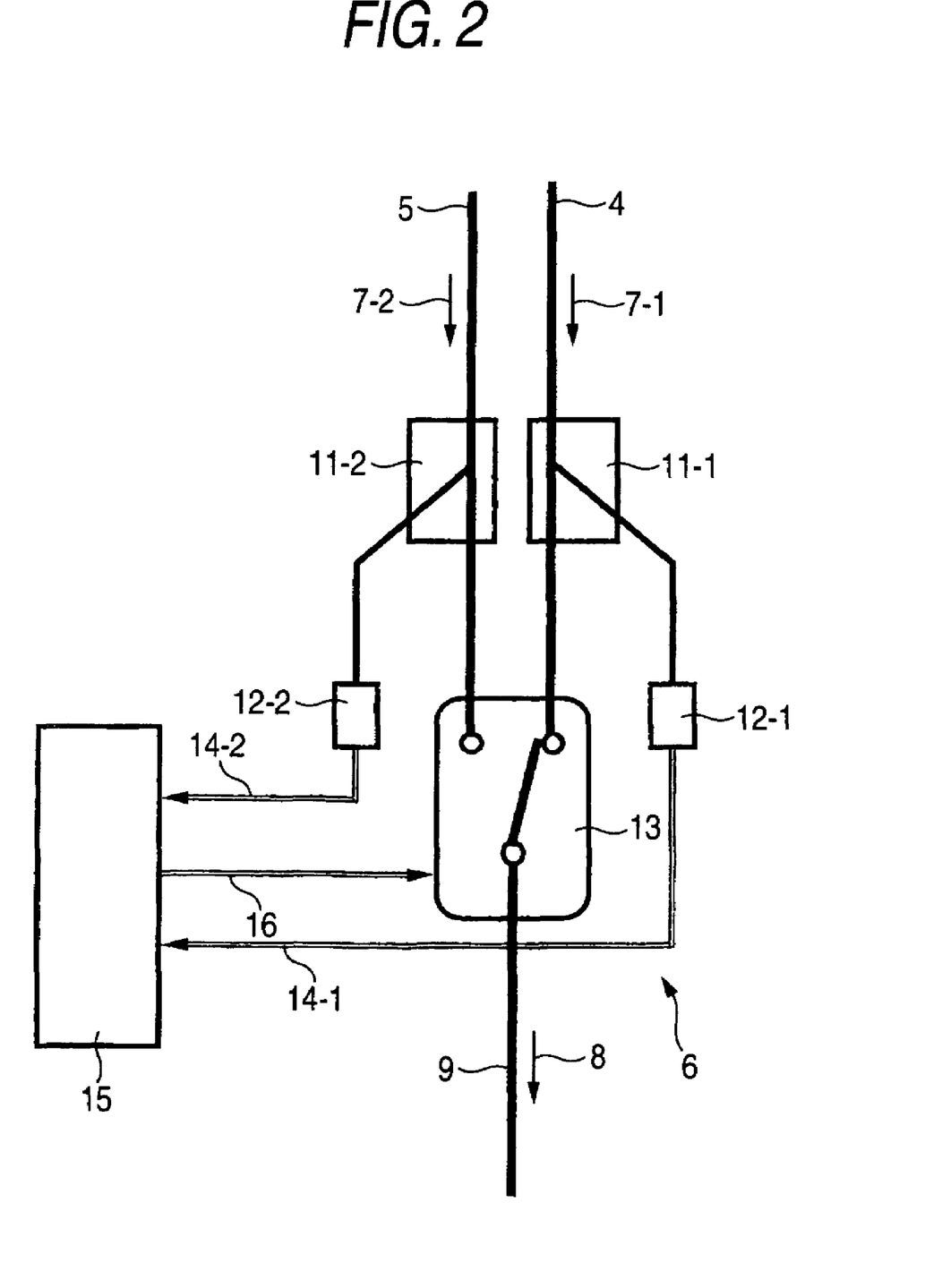
FIG. 2 is a block diagram of a failure-protection optical path switching device.

FIG. 2 is a block diagram of the failure-protection optical path switching device 6, which comprises the working line 4, the backup line 5, the receiving-side line 9, optical tap circuits 11-1, 11-2, photodiodes 12-1, 12-2, an optical switch 13 having two input ports and one output port, electrical lines 14-1, 14-2, electronics 15, and electrical line 16.

During a normal time, the optical communication signal 7-1 is transmitted to the receiving-side line 9 by way of the optical switch 13. At this time, a portion of the optical communication signal (generally, 5% or less of optical communication signal power) of the working line 4 is extracted in the optical tap circuit 11-1, converted into an electric signal in the photodiode 12-1, and transmitted to the electronics 15 by way of the electrical line 14-1. The electronics 15 continuously monitor electric signals from the photodiode 12-1, thereby monitoring the transmission condition of the optical communication signal 7-1 in the working line 4. If the electronics 15 fail to receive the electric signal, the electronics 15 determine that a failure has occurred in the working line 4, and transmit to the optical switch 13 an electric signal for switching the optical switch, by way of the electrical line 16. As a result, an optical path in the optical switch 13 is switched, whereby the optical communication signal 7-2 from the backup line 5 is transmitted to the receiving-side line 9 by way of the optical switch 13.

After the failure in the working line 4 is eliminated, electric signals are transmitted from the photodiode 12-1 again. Accordingly, the electronics 15 transmit to the optical switch 13 an electric signal for switching the optical switch, thereby returning the condition so that the optical communication signal 7-1 from the working line 4 is transmitted to the receiving-side line 9. Thus, the failure in the optical communication network is recovered.

Meanwhile, similar to the case of the working line 4, the electronics 15 continuously monitor electric signals input to the backup line 5, by way of the optical tap circuit 11-2 and the photodiode 12-2, thereby monitoring a transmission condition of the optical communication signal 7-2 in the backup line 5.

Figure 3:
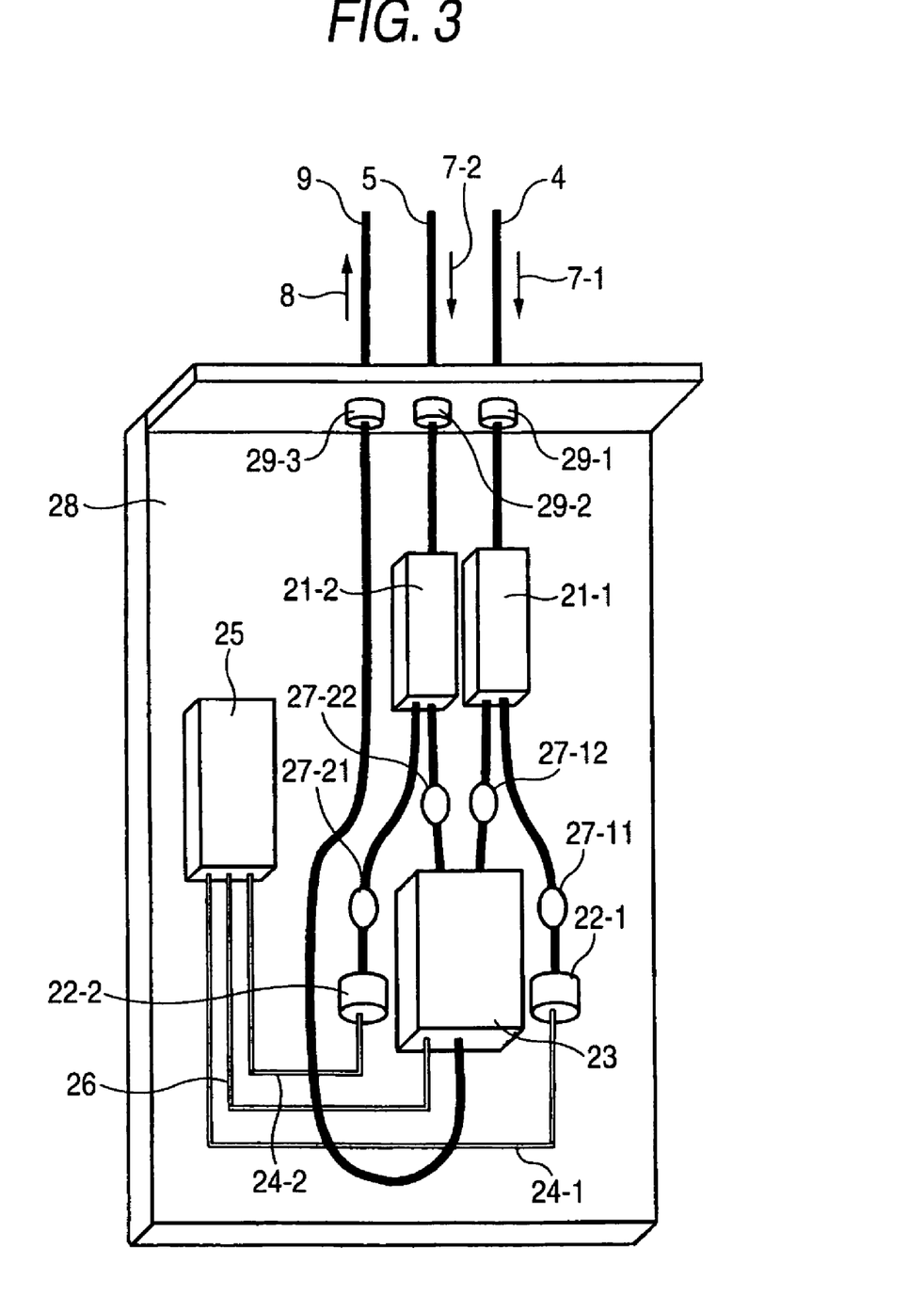
FIG. 3 shows an example of a conventional failure-protection optical path switching device.

FIG. 3 is a view for explaining a conventional example device into which the block diagram of a failure-protection optical path switching device shown in FIG. 2 is embodied. The conventional failure-protection optical path switching device comprises optical fiber couplers 21-1 and 21-2 serving as optical tap circuits, photodiodes 22-1 and 22-2, an optical switch 23, electrical lines 24-1 and 24-2, electronics 25, and electrical line 26. These components are mounted onto a printed board 28. The optical fiber couplers 21-1 and 21-2, the photodiodes 22-1 and 22-2, and the optical switch 23, respectively, are components having fiber pigtails. Therefore, as illustrated, the components are connected in optical fiber connecting sections 27-11, 27-12, 27-21, and 27-22 by means of fusion or adhesion.

The photodiodes 22-1, 22-2, and the electronics 25 are connected by way of the electrical lines 24-1, 24-2. The electronics 25 and the optical switch 23 are connected by way of the electrical line 26. Fiber pigtails of the optical fiber couplers 21-1, 21-2, and those the optical switch 23 are connected with optical connectors 29-1, 29-2, and 29-3 as shown in the drawing. The conventional failure-protection optical path switching device configured as above has a function of switching to the backup line 5 in the event of a failure in the working line 4, thereby transmitting an optical communication signal to the receiving-side line 9 without interruption.

Reduction in footprint has recently become an important requirement for optical communication equipment. According to a general rule, the smaller the volume of optical communication equipment, the lower the cost and the less work required for installation. Accordingly, miniaturization of a failure-protection optical path switch device which is to be incorporated in the optical communication equipment is also required.

However, a conventional failure-protection optical path switch device has a disadvantage of being of large size and expensive.

The optical fiber couplers, the photodiodes, and the optical switch respectively assume the form of independent components; and each of the components requires packaging for ensuring reliability. Accordingly, the respective components are increased in size, and require materials and man-hours for packaging, thereby becoming expensive.

In addition, each of the components includes a fiber pigtail. Accordingly, the components must be connected by means of fusion or adhesion between the fibers; however, since at least about 3 cm of work space is required to connect the fibers, the components cannot be disposed close to each other, whereby the device becomes large. Furthermore, since connection of optical fibers within a small space requires a high level of skill, such work is expensive.

Meanwhile, in FIG. 3, for the sake of simplicity, storage of slack optical fiber is not illustrated. However, since the optical fiber cannot be bent at sharp angles, storage of slack fiber for allowing the optical fiber a margin is required. Accordingly, the failure-protection optical path switching device is further increased in size.

For the above reasons, the conventional failure-protection optical path switch device is of large size and expensive.

BRIEF SUMMARY OF THE INVENTION

Briefly stated, the present invention comprises an optical input, an optical path switch, an optical output, an optical branching device, and an optical signal detection device. At least two of the optical input, the optical path switch, the optical output, the optical branching device, and the optical signal detection device are mounted onto a single platform.

The present invention also comprises optical input means constituted of optical fiber collimators and for emitting a light beam, output means constituted of an optical fiber collimator and for receiving a light beam, optical path switching means constituted of a fixed prism and a movable prism disposed between the input means and the output means, moving means including an actuator for moving the movable prism, monitor means constituted of an optical tap device and a light-receiving device; and control means which determines whether or not a failure has occurred, on the basis of an electric signal from the monitor means, and which sends an electric signal to the actuator upon occurrence of a failure. The optical path switching device is also characterized in that at least two of the optical fiber collimator, the actuator connected to the movable prism, the fixed prism, the optical tap device, and the light-receiving device are mounted onto a platform; and the input means, the output means, and the monitor means are coupled by means of luminous flux.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

FIGS. 4 to 7 are views for explaining a failure-protection optical path switching device according to the present invention.

Figure 4:
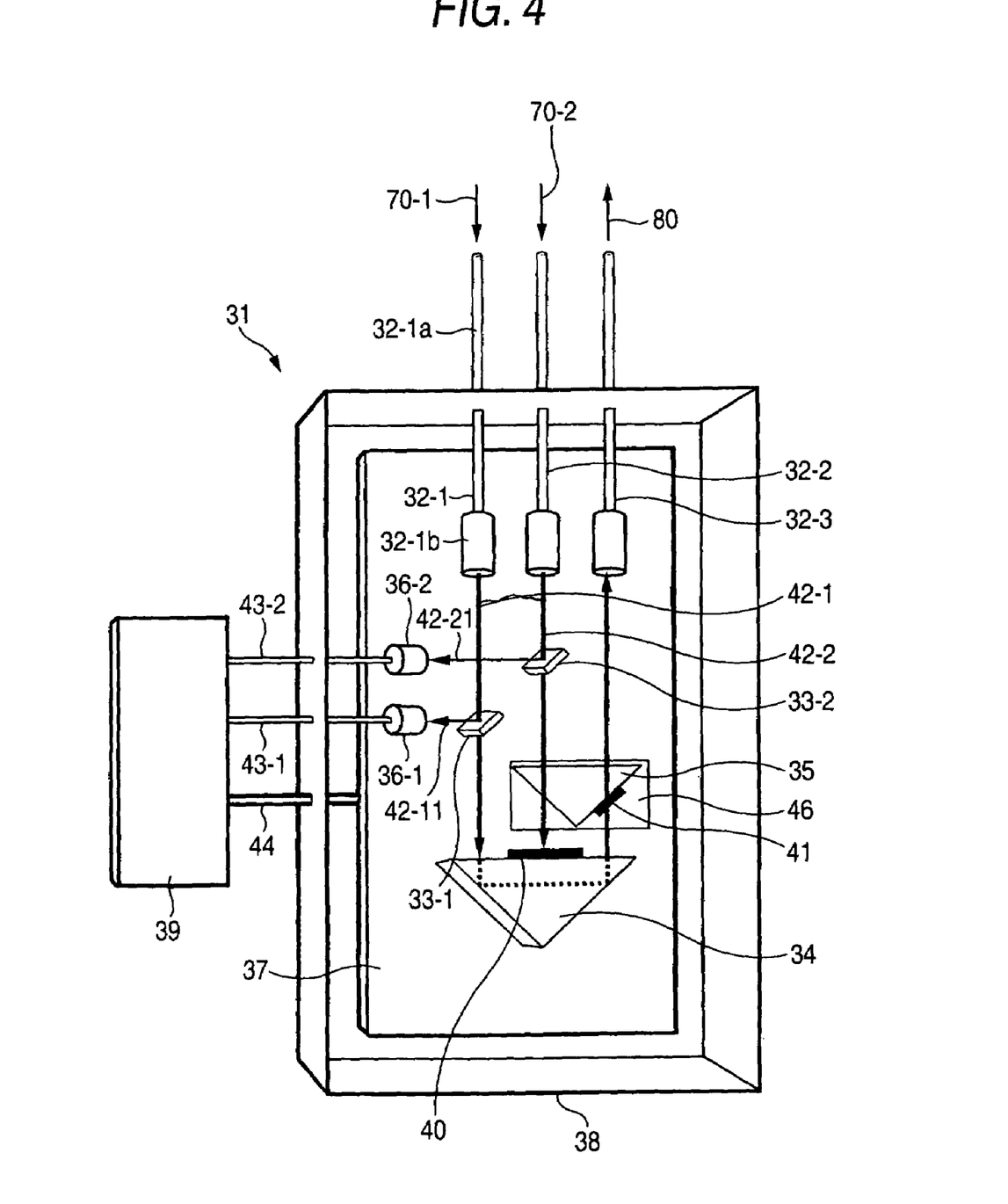
FIG. 4 is a perspective view of a failure-protection optical path switching device according to an embodiment of the invention.

FIG. 4 is a top view showing the configuration of the failure-protection optical path switching device.

A failure-protection optical path switching device 31 comprises optical fiber collimators 32-1 and 32-2 (input means), an optical fiber collimator 32-3 (output means), optical tap devices 33-1, 33-2, photodiodes 36-1, 36-2 (monitor means), a fixed prism 34 and a movable prism 35 (switching means), a platform 37, a package case 38, and electronics 39 (control means).

As shown in FIG. 4, the optical fiber collimators 32-1, 32-2, and 32-3 are arranged in parallel. Each of the optical fiber collimators is constituted of an optical fiber, and a lens attached on a tip of the optical fiber. For instance, the optical fiber collimator 32-1 is constituted of an optical fiber 32-1a and a lens 32-1b, and is designed and assembled so that parallel luminous flux exits the lens 32-1b. As the lens 32-1b, there is employed a member serving as a lens, such as a spherical lens, a drum lens, or a GRIN lens whose refractive index varies in accordance with a position.

Each of the fixed prism 34 and the movable prism 35 is a rectangular prism made of glass; and a reflection film coating for reflecting incident light is applied as required on two surfaces which form a right angle. On the oblique surface of the fixed prism 34, an optical absorber 40 is attached as shown in the drawing. Onto one of the surfaces forming the right angle of the movable prism 35, an optical absorber 41 is attached as shown in the drawing. As the optical absorber, a coating film of black paint or the like is employed.

The fixed prism 34 is disposed so as to allow a light beam 42-1 from the optical fiber collimator 32-1 to enter the optical fiber collimator 32-3. The movable prism 35 is disposed so that, when the prism 35 is inserted in an optical path of a light beam 42-2 from the optical fiber collimator 32-2, the optical beam 42-2 enters the optical fiber collimator 32-3. The movable prism 35 is disposed closer to the optical fiber collimators 32-1, 32-2, and 32-3 than is the fixed prism 34.

The optical tap devices 33-1, 33-2 are for reflecting optical beams at a predetermined reflectance; and are formed, for instance, by means of applying multilayered reflection-film coating on a glass platform. The reflectance is set so that the quantity of light falls within a range where monitoring is possible. In many cases, the reflectance is set to about 5%. The optical tap devices 33-1, 33-2 are inserted into the corresponding optical paths of the optical beams 42-1, 42-2, and extract corresponding tap optical beams 42-11, 42-21 at an angle of approximately 90 degrees.

Each of the photodiodes 36-1, 36-2 is disposed to form an angle of about 90 degrees with the corresponding light beam 42-1, 42-2, to thus enable receiving of the tap light beams 42-11, 42-21.

The optical fiber collimators 32-1, 32-2, 32-3, the fixed prism 35, the optical tap devices 33-1, 33-2, and the photodiodes 37-1, 37-2 are mounted onto the platform 37 by means of adhesive fixation or the like so as to realize the above-mentioned positional relationship.

Electrical lines 43-1, 43-2, which are continuous with the photodiodes 36-1, 36-2, are connected with the electronics 39.

Figure 5:
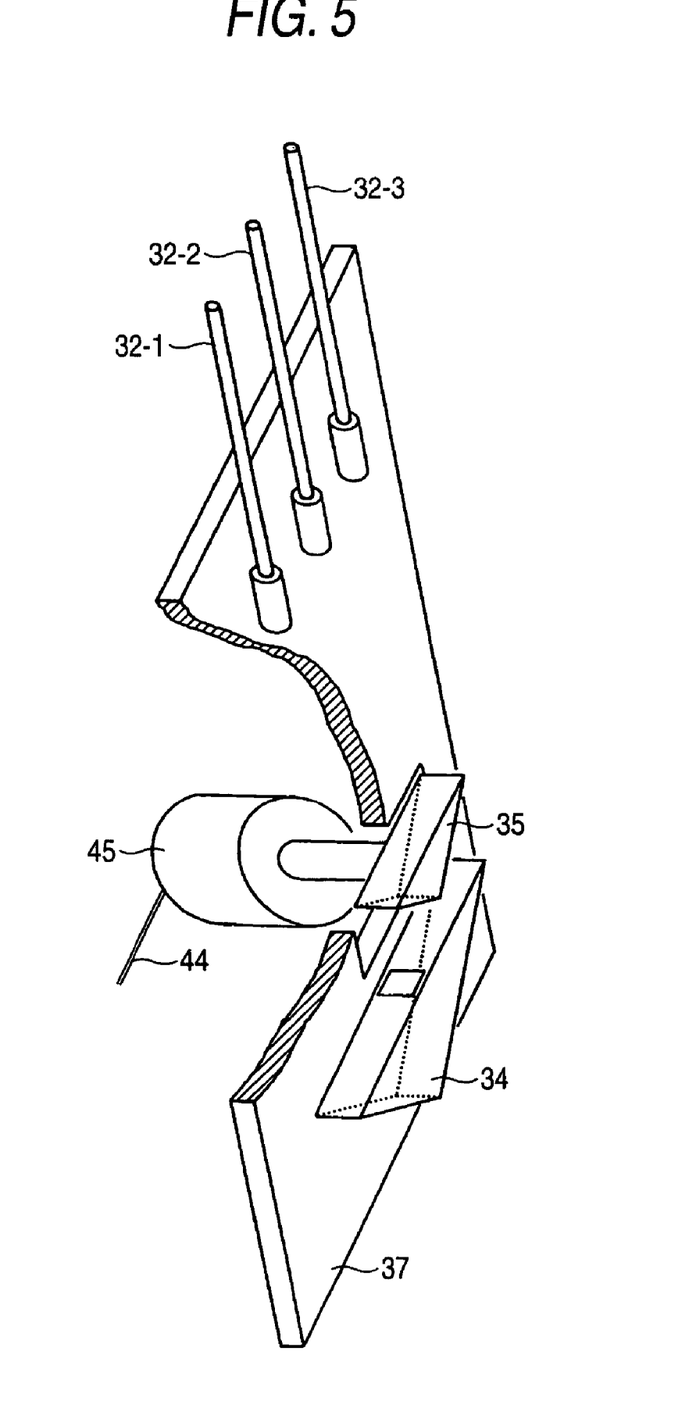
FIG. 5 is a view for explaining a movable prism and an actuator of the failure-protection optical path switching device according to the embodiment of the invention.

The movable prism 35 is configured so as to be inserted into the optical path of the light beam 42-2 through a hole 46 disposed in the platform 37. The movable prism 35 is connected with an actuator 45 (moving means) as shown in FIG. 5. The actuator 45 is driven in accordance with an electric signal from electrical line 44, thereby vertically moving the movable prism 35. A member having a translating function, such as a solenoid, is employed as the actuator 45. The actuator 45 is attached to the platform 37 so as to locate the movable prism 35 at a predetermined position in relation to the light beam 42-2.

The platform 37, onto which the element components have been mounted, is stored in the package case 38 as shown in FIG. 4, and sealed while being covered with a top cover (The top cover is not shown in FIG. 4). The package case 38 is sealed by means of an adhesive sealing method or a weld-sealing method. The electric lines 43-1, 43-2, and the electric line 44 are pulled out from a side face of the package 38 and connected to the electronics 39 through use of a hermetic sealing method. Fiber pigtails of the optical fiber collimators 32-1, 32-2, 32-3 are pulled out of a side face of the package case 39 by means of a feed through structure.

The optical fiber collimator 32-1 is connected to the working line, the optical fiber collimator 32-2 is connected to the backup line, and the optical fiber collimator 32-3 is connected to the receiving-side line.

As described above, the failure-protection optical path switching device according to the embodiment enables miniaturization and cost reduction by means of being configured as follows. That is, the optical path switching device includes as components compact and unpackaged optical tap devices, a compact and unpackaged optical switch, and photodiodes as components; the components are mounted onto a single platform; and the components are coupled by means of light beams.

Next, operation of the failure-protection optical path switching device will be described by reference to FIGS. 6 and 7.

Figure 6:
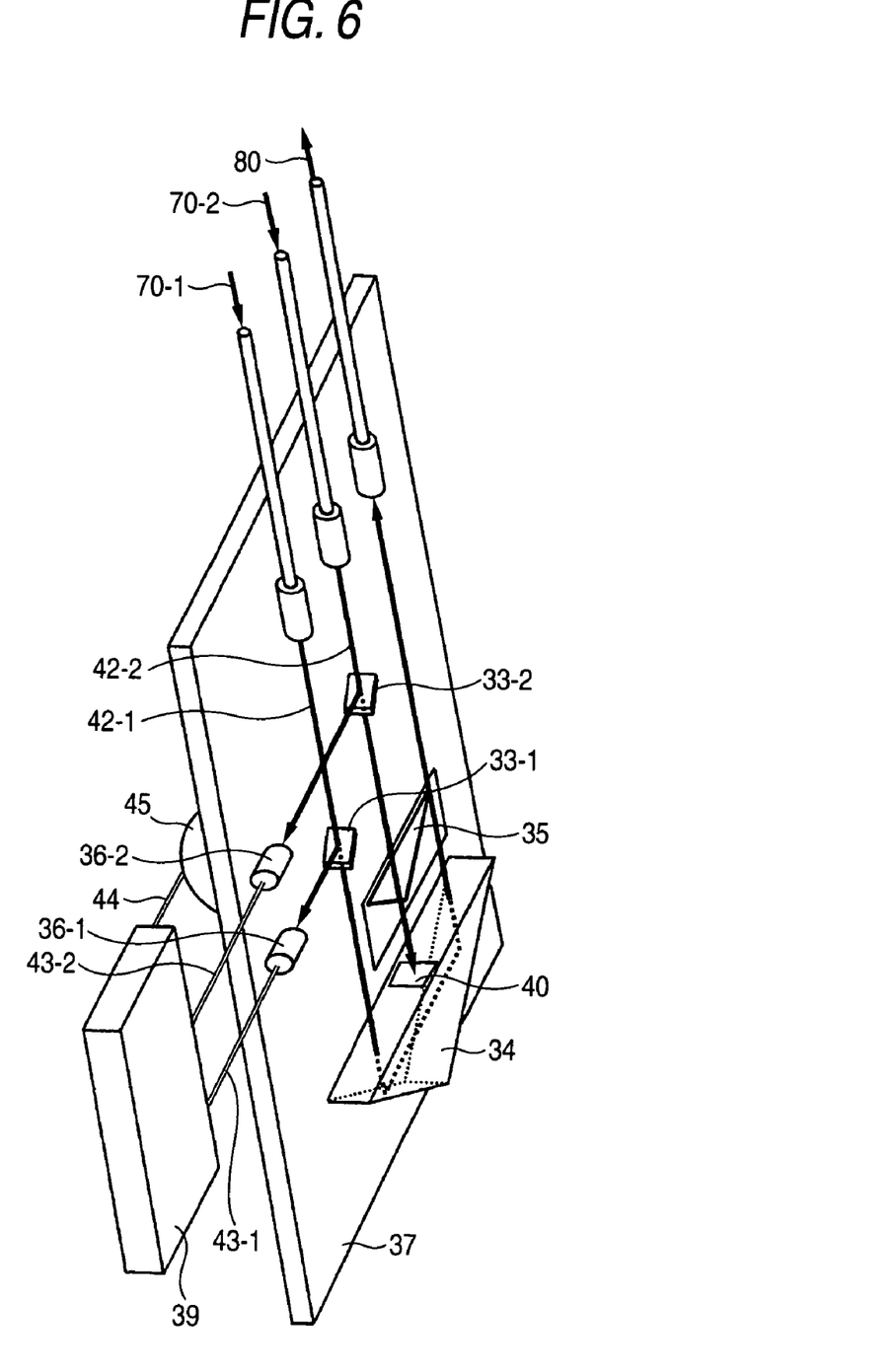
FIG. 6 is a view for explaining operations in a case where no failure has occurred in the failure-protection optical path switching device according to the embodiment of the invention.

FIG. 6 shows a monitoring condition of a case where no failure has occurred in the working line.

The movable prism 35 is set to a location lower than the platform 37.

The light beam 42-1 of the working line is input to the optical fiber collimator 32-3 by way of the fixed prism 34, and thereafter transmitted as the received optical communication signal 80. Meanwhile, the light beam 42-2 of the protection line is absorbed by the optical absorber 40.

Monitoring of the working line is performed as follows. A portion of a light beam, which is denoted by 42-1, of the optical line is extracted in the optical tap circuit 33-1, converted into an electric signal in the photodiode 36-1, and transmitted to the electronics 39 by way of the electrical line 43-1. The electronics 39 continuously monitor electric signals from the photodiode 37-1, thereby monitoring the transmission condition of the optical communication signal 7-1 in the working line. If the electronics 39 fail to receive the electric signal, the electronics 39 determine that a failure has occurred in the working line, and transmit an electric signal for moving the movable prism 35 upward, by way of the electrical line 44 to the actuator 45.

Figure 7:
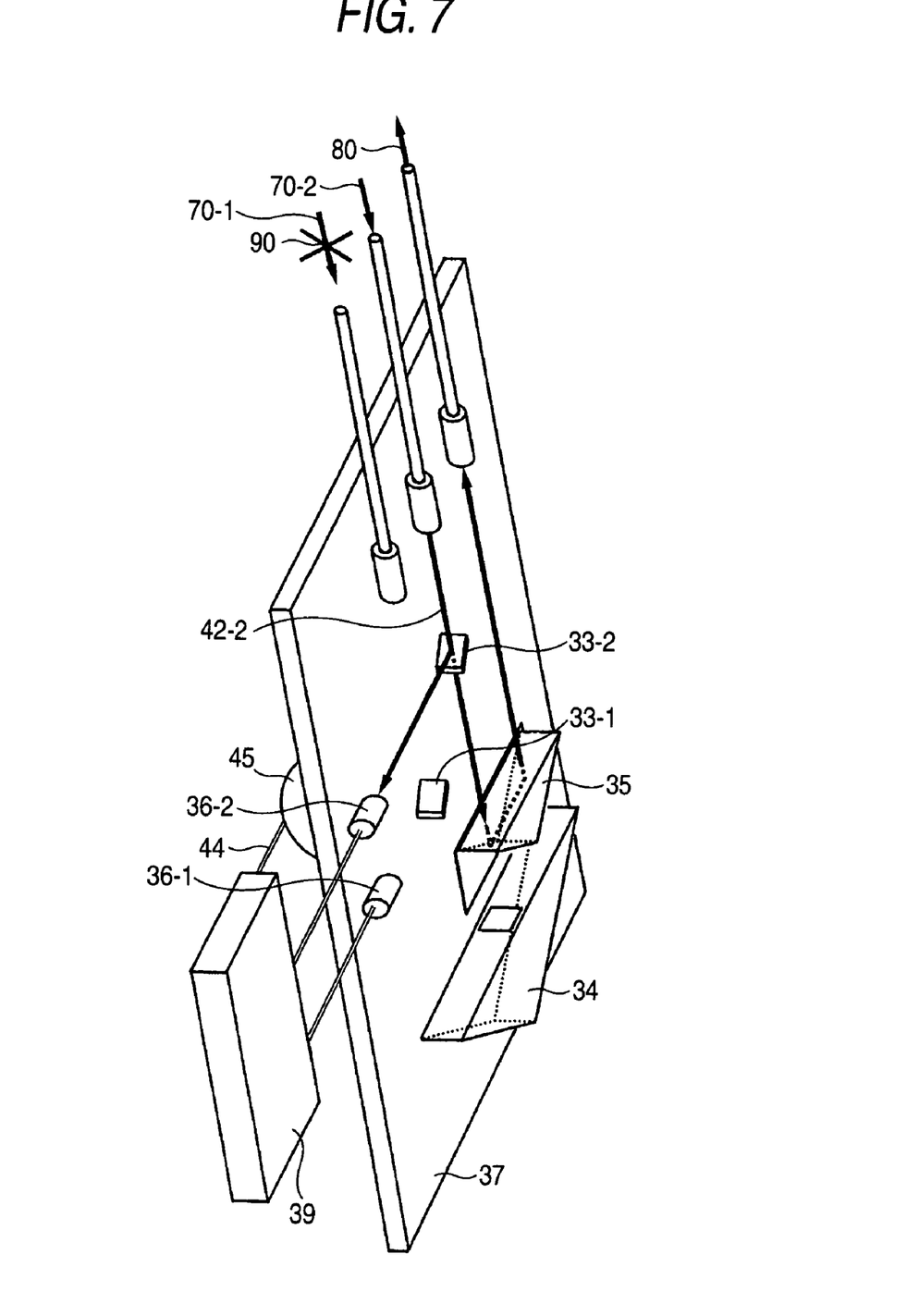
FIG. 7 is a view for explaining operations in a case where a failure has occurred in the failure-protection optical path switching device according to the embodiment of the invention.

Consequently, as shown in FIG. 7, the movable prism 35 is inserted into the optical path of the light beam 42-2 of the backup line, whereby the optical communication signal 7-20 of the backup line is transmitted as the receiving optical communication signal 80. As described above, when the failure 90 has occurred, switching from the working line to the backup line is effected, whereby optical communication can be performed without an interruption in the receiving line.

After the failure 90 in the working line is eliminated, electric signals are transmitted from the photodiode 36-1 to the electronics 39 again. Accordingly, the electronics 39 transmit an electric signal for returning the movable prism 35 to the position lower than the platform 37, thereby returning to the original state.

When a failure is eliminated from a condition shown in FIG. 7 and an optical communication signal is input, an optical beam corresponding to the optical beam 42-1 in FIG. 6 impinges on the movable prism 35. Therefore, the optical absorber 41 is attached on a side face of the movable prism 35. (The location where the optical absorber is attached is shown in FIG. 4.)

Meanwhile, similar to the case of the working line, the electronics 39 continuously monitor electric signals input to the backup line by way of the optical tap device 33-2 and the photodiode 36-2, thereby monitoring a transmission condition of the optical communication signal in the backup line.

In the hithertofore described first embodiment of the invention, the optical fiber collimators 32-1, 32-2, 32-3, the fixed prism 34, the movable prism 35, and the actuator 45 serve as a 2×1 optical switch; the optical tap devices 33-1, 33-2, the photodiodes 36-1, 36-2, and the electronics 39 function as monitoring means of the line; and these functions are integrated.

In the above embodiment, the configuration where the electronics 39 are located outside the package case 38 has been shown; however, the electronics 39 may be contained in the package, as required. In addition, in the embodiment, rectangular prisms are used as the fixed prism 34 and the movable prism 35; however, there may be adopted a configuration in which two mirrors are disposed so as to form a V-shape for changing the direction of a light beam.

FIGS. 8 to 11 are views for explaining a failure-protection optical path switching device according to another embodiment of the invention.

Figure 8:
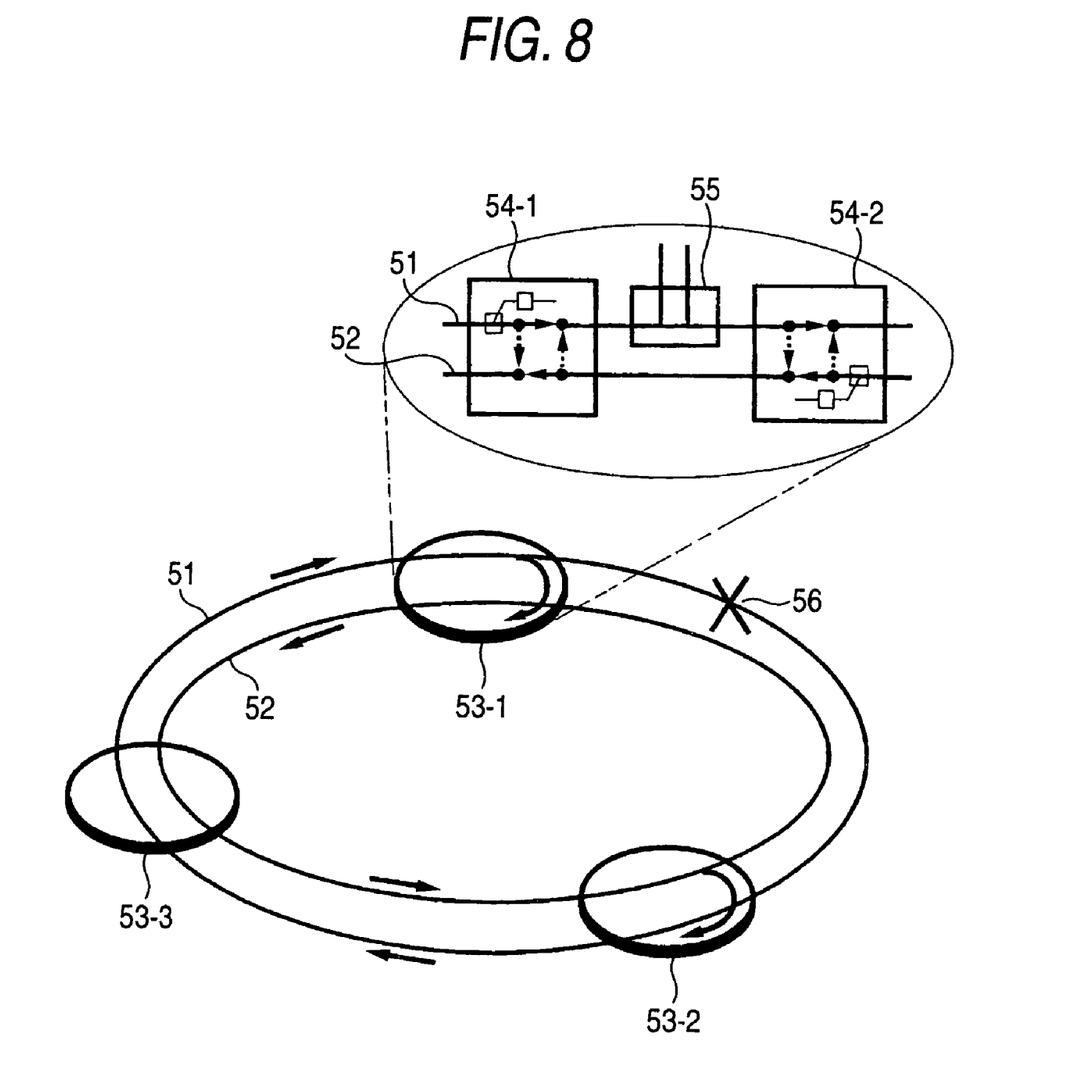
FIG. 8 is a view for explaining an example of failure-protection line switching employed in a ring optical communication network.

FIG. 8 is a view schematically showing a ring optical communication network, and in which there is shown an embodiment where the working line constituted of an optical fiber 51 and a backup line 52 are laid into a ring as a pair of communication lines, and base stations 53-1, 53-2, and 53-3 are disposed at predetermined locations in the communication lines. The base station 53-1 basically comprises a failure-protection optical path switching device 54-1 provided upstream, a failure-protection optical path switching device 54-2 provided downstream, and an optical add/drop device 55. The upstream failure-protection optical path switching device 54-1 has a function of serving as a 2×2 optical switch and a function of monitoring the working line 51. The downstream failure-protection optical path switching device 54-2 has a function of serving as a 2×2 optical switch and a function of monitoring a protection line 52. The optical add/drop device 55 has a function of dropping only a predetermined optical communication signal among a plurality of optical communication signals being transmitted in the working line 51, and to add a predetermined optical communication signal to a plurality of optical communication signals being transmitted in the working line 51.

Figure 9:
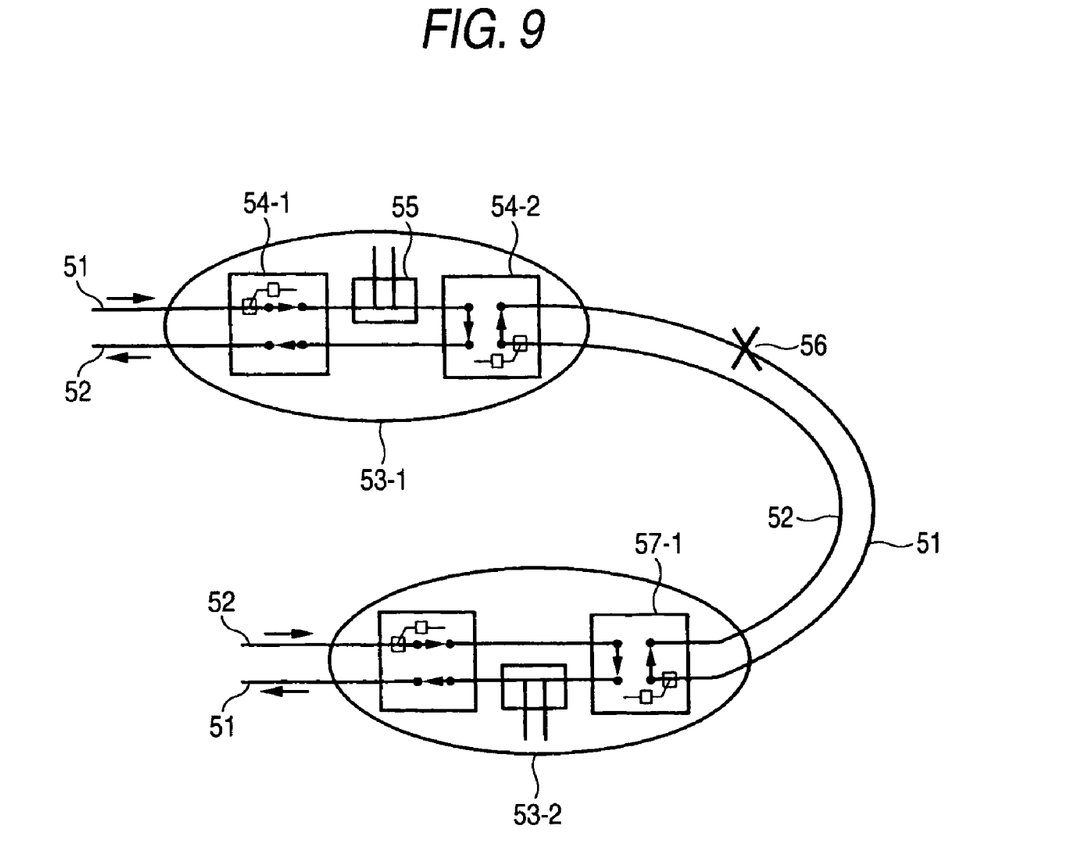
FIG. 9 is a view for explaining operations of the failure-protection optical path switching device in a case where a failure has occurred.

When a failure 56 occurs at a portion between the base stations 53-1 and 53-2, as shown in FIG. 9, the failure-protection optical path switching device 54-2 provided downstream of the base station 53-1 connects the working line 51 and the backup line 52; and the failure-protection optical path switching device 57-1 provided upstream of the base station 53-2 connects the backup line 52 and the working line 51. Accordingly, a bypass line avoiding the portion of the failure 56 is configured, thereby preventing an interruption in optical communication.

Figure 10:
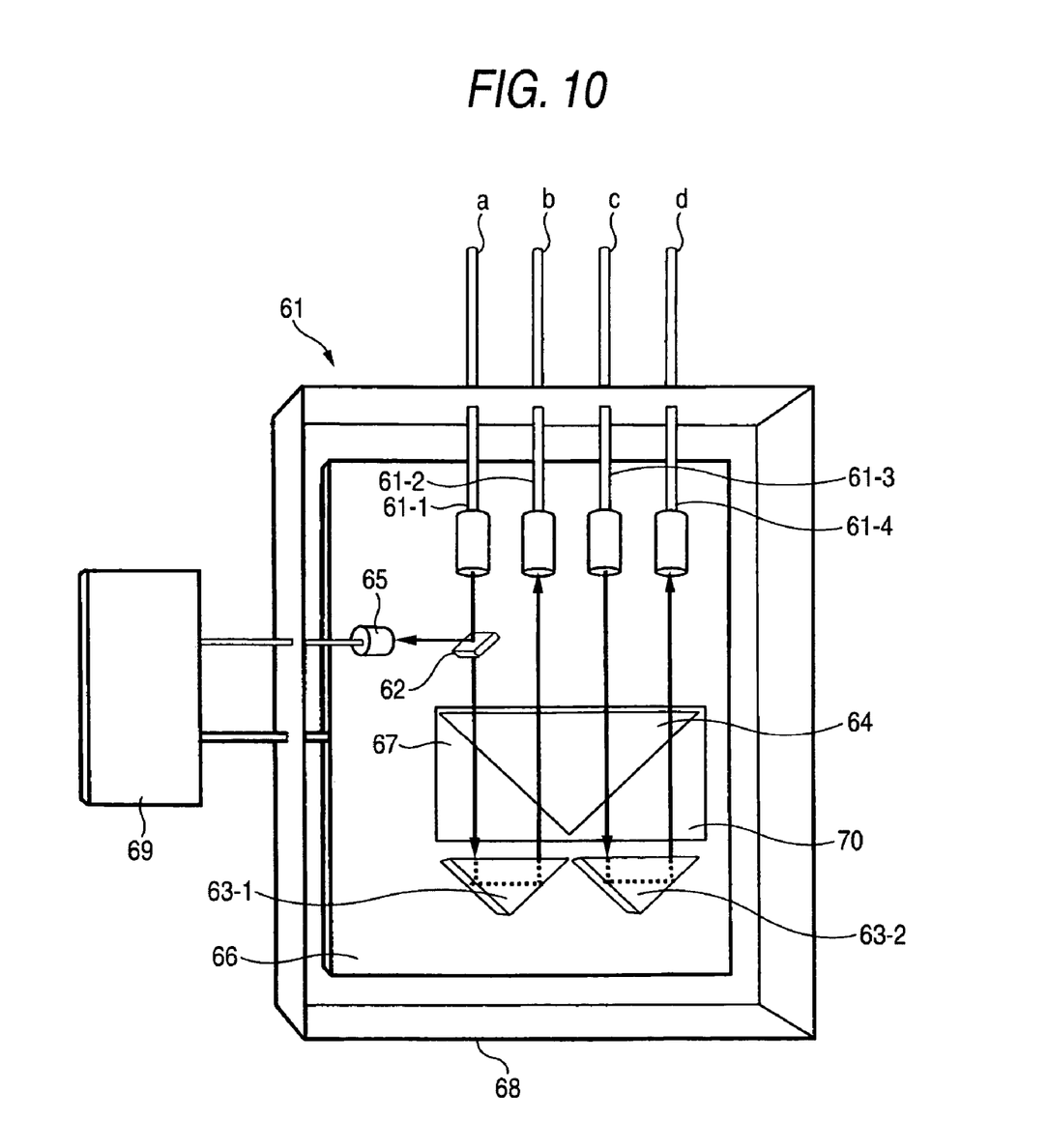
FIG. 10 is a perspective view for explaining operations of a failure-protection optical path switching device according to another embodiment of the invention, in a case where no failure has occurred.

FIG. 10 shows a configuration of a failure-protection optical path switching device 61, which comprises optical fiber collimators 61-1, 61-2, 61-3, 61-4, an optical tap device 62, fixed prisms 63-1, 63-2, a movable prism 64, a photodiode 65, a platform 66, an actuator 67 (since the actuator 67 is disposed below the platform 66, it is not illustrated in the drawing), a package case 68, electronics 69, and a hole 70 disposed in the platform.

End sections of the optical fiber collimators 61-1, 61-2, 61-3, and 61-4 are denoted as "a," "b," "c," and "d," respectively. A portion of an optical communication signal input in the end section "a" is extracted in the optical tap device 62, converted into an electric signal in the photodiode 65, and transmitted to the electronics 69, thereby being utilized for monitoring of a transmission condition of optical communication signals.

Figure 11:
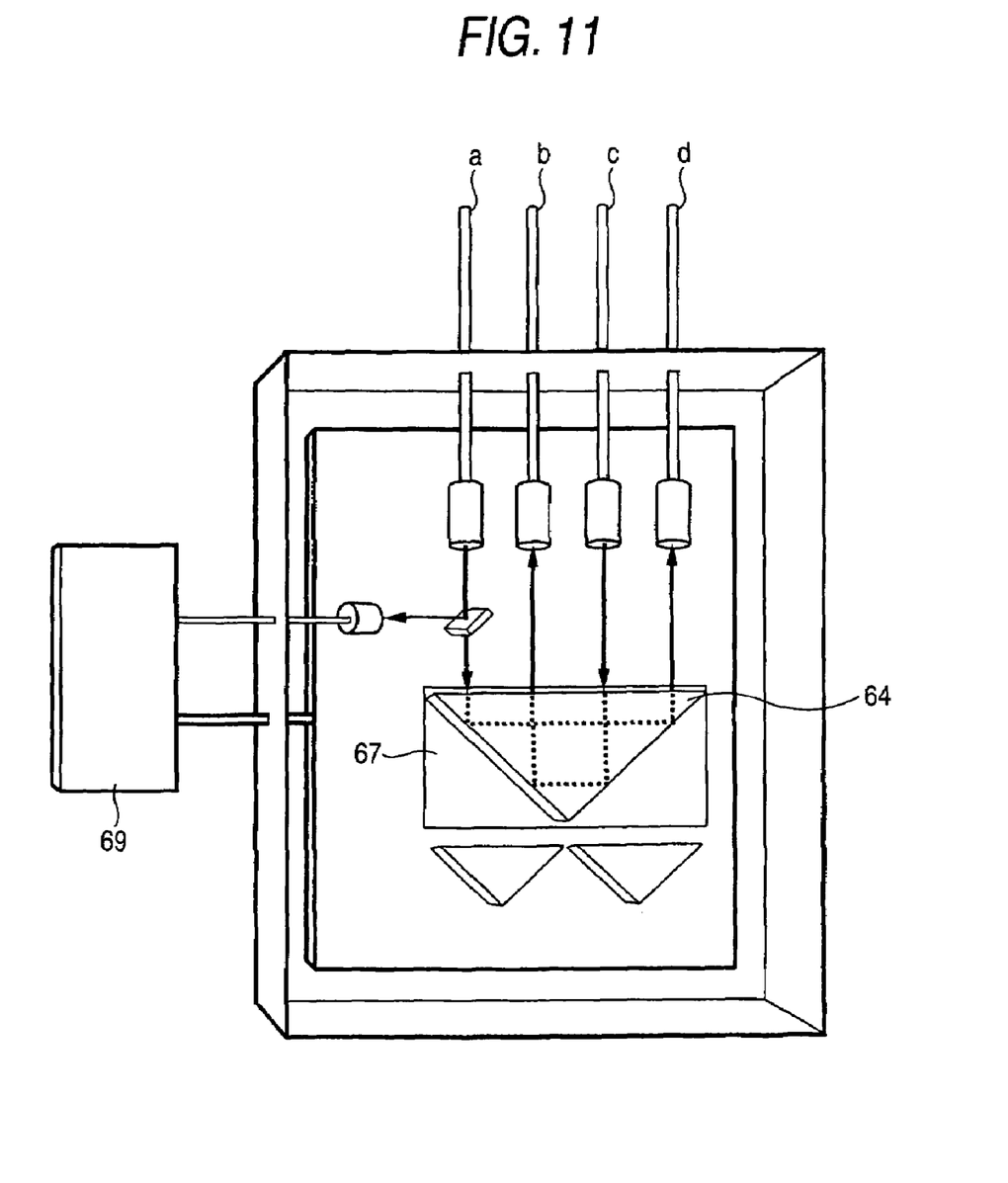
FIG. 11 is a view for explaining operations in the failure-protection optical path switching device of the other embodiment of the invention, in a case where a failure has occurred.

FIG. 10 shows a state where the movable prism 64 is set to a lower position, wherein the end sections "a" and "b" are connected, and the end sections "c" and "d" are connected. When the electronics 69 send to the actuator 67 an electric signal for switching the optical switch, as shown in FIG. 11, the movable prism 64 moves to a raised position, thereby connecting the end sections "a" and "d," and connecting the end sections "c" and "b."

The upstream failure-protection optical path switching device upstream of each of the base stations connects the end section "a" to an input side of the working line 51; the end section "b" with an input side of the optical add/drop device; the end section "c" with the end section "b" of the downstream failure-protection optical path switching device; and the end section "d" with an output side of the backup line 52.

Meanwhile, the failure-protection optical path switching device downstream of the same connects the end section "a" to an input side of the backup line 52; the end section "b" with the end section "c" of the upstream failure-protection optical path switching device; the end section "c" with an output side of the optical add/drop device; and the end section "d" with an output side of the working line 51.

A procedure for setting a bypass line when a failure 56 has occurred at a portion between the base stations 53-1 and 53-2 as shown in FIG. 9 will be described hereinbelow. First, the failure-protection optical path switching device 54-1 upstream of the base station 53-2 detects occurrence of the failure 56. Accordingly, the failure-protection optical path switching device 57-1 is driven to thus connect the backup line 52 with the working line 51. Simultaneously, the base station 53-1 is notified of occurrence of the failure 56. The base station 53-1 immediately drives the failure-protection optical path switching device 54-2 downstream of the base station 53-1 to thus connect the working line 51 with the backup line 52. Thus, a bypass line constituted of the working line 51 and the backup line 52 is set as shown in FIG. 8, thereby enabling avoidance of optical communication breakdown having arisen from a failure. When the failure is eliminated, the failure-protection optical path switching device 57-1 of the base station 53-2 and the failure-protection optical path switching device 54-2 of the base station 53-1 are returned to their original conditions, thereby returning to a normal communication state.

As described above, the optical path switching device of the invention is advantageous as compared with the conventional device, in that a space for storage of slack optical fiber is reduced, thereby enabling miniaturization; and in that the amount of the complicated work of connecting optical fibers is reduced, to thus enable cost reduction. By virtue of these two effects, the footprint of the optical path switching device, in a state of being mounted on a printed board, of the invention is reduced to less than $\frac{1}{20}$ that of the conventional device. In addition, the optical path switching device of the invention is configured by means of mounting the optical fiber collimators, the optical tap devices, the fixed prism, the movable prism, and the photodiodes on the platform and coupling them by means of light beams. In the configuration, the platform serves as an optical bench, whereby alignment accuracy of 0.5 μm and angular accuracy of 0.01 degree can be attained with ease. Accordingly, the optical path switching device of the invention is advantageous in that assembly work is facilitated; favorable optical characteristics can be easily obtained; and long-term stability is excellent.

The optical path switching device of the invention is applicable to optical communication equipment, or the like, for use in the field of optical communication, such as an optical information network, or an optical LAN (Local Area Network).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical path switching device comprising:
    optical input means including a first optical fiber collimator for emitting a parallel luminous flux;
    output means including a second optical fiber collimator for receiving a parallel luminous flux;
    optical path switching means including a fixed prism and a movable prism disposed on an optical path coupling the means and the output means to each other;
    moving means including an actuator for moving the movable prism;
    monitor means constituted of an optical tap device and a light-receiving device; and
    control means which determines whether or not a failure has occurred, on the basis of an electric signal from the monitor means, and which sends an electric signal to the actuator upon occurrence of a failure, wherein
    each of the optical fiber collimators, the fixed prism, the optical tap device, and the light-receiving device are separately formed and mounted onto a platform; and
    the movable prism is separately formed in front of the fixed prism toward the first and second optical fiber collimators and moved on the platform to be inserted in an optical path between the optical input means and the output means when the failure has occurred,
    the input means, the optical path switching means, the output means, and the monitor means are optically coupled by means of the parallel luminous flux on an identical plane on the platform.

2. The optical path switching device according to claim 1, wherein the input means is constituted of two or more input means; and monitor means for monitoring at least two luminous flux of luminous flux from the respective input means is provided.

3. The optical path switching device according to claim 2, wherein a first absorber section is disposed on the fixed prism so that first luminous flux, which has been selected among luminous flux having entered by way of at least two incidence means and which is to be coupled to output means, is projected onto the absorber section.

4. The optical path switching device according to claim 3, wherein a second absorber section is disposed on the movable prism so that second luminous flux is projected onto the second absorber section.

* * * * *